(12) United States Patent
Dunham et al.

(10) Patent No.: US 11,133,540 B2
(45) Date of Patent: Sep. 28, 2021

(54) BATTERY THERMAL MANAGEMENT SYSTEM

(71) Applicant: FORD GLOBAL TECHNOLOGIES, LLC, Dearborn, MI (US)

(72) Inventors: Jim William Dunham, Plymouth, MI (US); Eric Emil Jackson, Canton, MI (US); Paul Elia, West Bloomfield, MI (US); Timothy Alan Mouch, Troy, MI (US); Jagjit Romana, Northville, MI (US); Chris P. Roxin, West Bloomfield, MI (US); Charlie Qian, Dearborn, MI (US); Stephen Pien, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/739,777

(22) Filed: Jan. 10, 2020

(65) Prior Publication Data
US 2020/0168961 A1    May 28, 2020

Related U.S. Application Data

(62) Division of application No. 14/630,951, filed on Feb. 25, 2015, now Pat. No. 10,573,940.

(51) Int. Cl.
| | | |
|---|---|---|
| *H01M 10/613* | (2014.01) | |
| *H01M 10/625* | (2014.01) | |
| *H01M 10/633* | (2014.01) | |
| *H01M 10/48* | (2006.01) | |
| *H01M 10/6567* | (2014.01) | |
| *H01M 10/615* | (2014.01) | |
| *H01M 10/617* | (2014.01) | |
| *H01M 10/663* | (2014.01) | |
| *H01M 10/63* | (2014.01) | |

(52) U.S. Cl.
CPC ....... *H01M 10/613* (2015.04); *H01M 10/486* (2013.01); *H01M 10/615* (2015.04); *H01M 10/617* (2015.04); *H01M 10/625* (2015.04); *H01M 10/63* (2015.04); *H01M 10/633* (2015.04); *H01M 10/6567* (2015.04); *H01M 10/663* (2015.04); *H01M 2220/20* (2013.01)

(58) Field of Classification Search
CPC ............. H01M 10/613; H01M 10/633; H01M 10/6567; H01M 10/486; H01M 10/615; H01M 10/617; H01M 10/663; H01M 10/625; H01M 10/63; H01M 2220/20; H01M 10/42; Y02E 60/10; Y02T 10/70; B60L 58/24
See application file for complete search history.

(56) References Cited

U.S. PATENT DOCUMENTS

| | | | |
|---|---|---|---|
| 2009/0249807 A1* | 10/2009 | Nemesh | B60H 1/00278 62/117 |
| 2009/0280395 A1 | 11/2009 | Nemesh et al. | |
| 2014/0144160 A1* | 5/2014 | Jackson | H01M 10/625 62/62 |
| 2014/0216689 A1 | 8/2014 | Lombardo et al. | |
| 2014/0216693 A1* | 8/2014 | Pekarsky | H01M 10/60 165/104.31 |
| 2016/0339767 A1 | 11/2016 | Enomoto et al. | |

FOREIGN PATENT DOCUMENTS

| | | |
|---|---|---|
| CN | 102198784 A | 9/2011 |
| CN | 102301523 A | 12/2011 |

OTHER PUBLICATIONS

Second Office Action for CN Application 2016100901204 dated Dec. 10, 2019.

* cited by examiner

*Primary Examiner* — Muhammad S Siddiquee
(74) *Attorney, Agent, or Firm* — David B. Kelley; Carlson, Gaskey & Olds

(57) ABSTRACT

A battery thermal management system according to an exemplary aspect of the present disclosure includes, among other things, a battery assembly and a coolant subsystem that circulates coolant through the battery assembly. The battery assembly is heated by a first portion of the coolant from an engine if a temperature of the battery assembly is below a first temperature threshold and is cooled by a second portion of the coolant from a chiller if the temperature is above a second temperature threshold.

13 Claims, 3 Drawing Sheets

BATTERY THERMAL MANAGEMENT SYSTEM

CROSS-REFERENCE TO RELATED APPLICATIONS

This is a divisional of U.S. patent application Ser. No. 14/630,951, which was filed on Feb. 25, 2015, the entire disclosure of which is hereby incorporated by reference.

TECHNICAL FIELD

This disclosure relates to a battery thermal management system for an electrified vehicle. The battery thermal management system is configured to heat a battery assembly if its temperature is below a first temperature threshold and cool the battery assembly if its temperature is above a second temperature threshold.

BACKGROUND

The need to reduce fuel consumption and emissions in vehicles is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines of an electrified vehicle. The battery pack may include one or more groupings of interconnected battery cells. The battery cells generate heat during certain conditions, such as charging and discharging operations. Battery thermal management systems are employed to manage the heat generated by the battery cells of the battery pack.

SUMMARY

A battery thermal management system according to an exemplary aspect of the present disclosure includes, among other things, a battery assembly and a coolant subsystem that circulates coolant through the battery assembly. The battery assembly is heated by a first portion of the coolant from an engine if a temperature of the battery assembly is below a first temperature threshold and is cooled by a second portion of the coolant from a chiller if the temperature is above a second temperature threshold.

In a further non-limiting embodiment of the foregoing system, the coolant subsystem includes the engine, a radiator, a three-way valve, a temperature sensor, a T-joint, a pump, and a chiller loop that includes the chiller.

In a further non-limiting embodiment of either of the foregoing systems, a refrigerant subsystem circulates a refrigerant, the refrigerant exchanging heat with the second portion of the coolant within the chiller.

In a further non-limiting embodiment of any of the foregoing systems, the coolant subsystem includes a three-way valve that controls the flow of the first portion and the second portion of the coolant to the battery assembly.

In a further non-limiting embodiment of any of the foregoing systems, the three-way valve is positioned between the engine and the battery assembly and between the chiller and the battery assembly.

In a further non-limiting embodiment of any of the foregoing systems, a controller is configured to control communication of the first portion and the second portion of the coolant through the battery assembly.

In a further non-limiting embodiment of any of the foregoing systems, the controller is configured to open a first inlet of a three-way valve to deliver the first portion of the coolant to the battery assembly and is configured to open a second inlet of the three-way valve to deliver the second portion of the coolant to the battery assembly.

In a further non-limiting embodiment of any of the foregoing systems, the coolant subsystem includes a radiator configured to cool the engine.

In a further non-limiting embodiment of any of the foregoing systems, a T-joint splits a flow of coolant exiting the battery assembly between a chiller loop that includes the chiller and the engine.

In a further non-limiting embodiment of any of the foregoing systems, the engine includes a thermostat that controls flow of the coolant exiting the engine.

A method according to another exemplary aspect of the present disclosure includes, among other things, heating a battery assembly using coolant from an engine if a temperature of the battery assembly is below a first temperature threshold and cooling the battery assembly using coolant from a chiller if the temperature is above a second temperature threshold.

In a further non-limiting embodiment of the foregoing method, the method includes performing heat transfer between the coolant from the chiller and a refrigerant.

In a further non-limiting embodiment of either of the foregoing methods, the method includes opening a first inlet of a three-way valve to deliver the coolant from the engine to the battery assembly if the temperature is below the first temperature threshold.

In a further non-limiting embodiment of any of the foregoing methods, the method includes opening a second inlet of the three-way valve to deliver the coolant from the chiller to the battery assembly if the temperature is above the second temperature threshold.

In a further non-limiting embodiment of any of the foregoing methods, the method includes monitoring a temperature of the battery assembly prior to the heating and cooling steps.

In a further non-limiting embodiment of any of the foregoing methods, the method includes dividing the flow of the coolant from the engine between a radiator and a three-way valve positioned upstream from the battery assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a battery thermal management system for an electrified vehicle. The battery thermal management system includes a coolant subsystem that circulates coolant through the battery assembly to either heat or cool the battery assembly. The coolant may exchange heat with refrigerant of a refrigerant subsystem. In some embodiments, the battery assembly is heated by coolant communicated from an engine if a temperature of the battery assembly is below a first temperature threshold. In other embodiments, the battery assembly is cooled by coolant communicated from a chiller if the temperature of the battery assembly is above a second temperature threshold. These and other features are discussed in greater detail in the following paragraphs of this detailed description.

Figure 1:
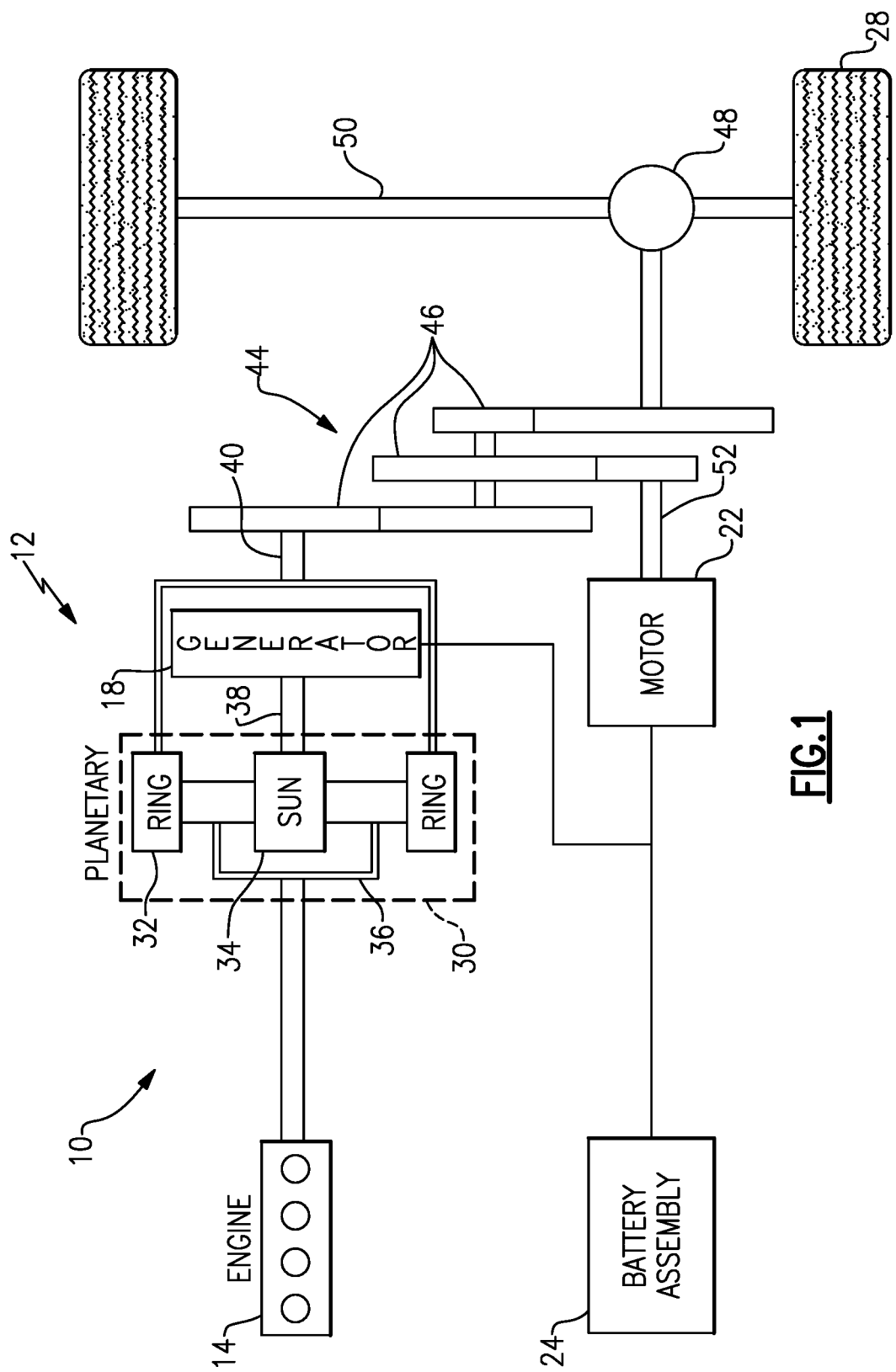
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including but not limited to, plug-in hybrid electric vehicles (PHEV's).

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery assembly 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery cells capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
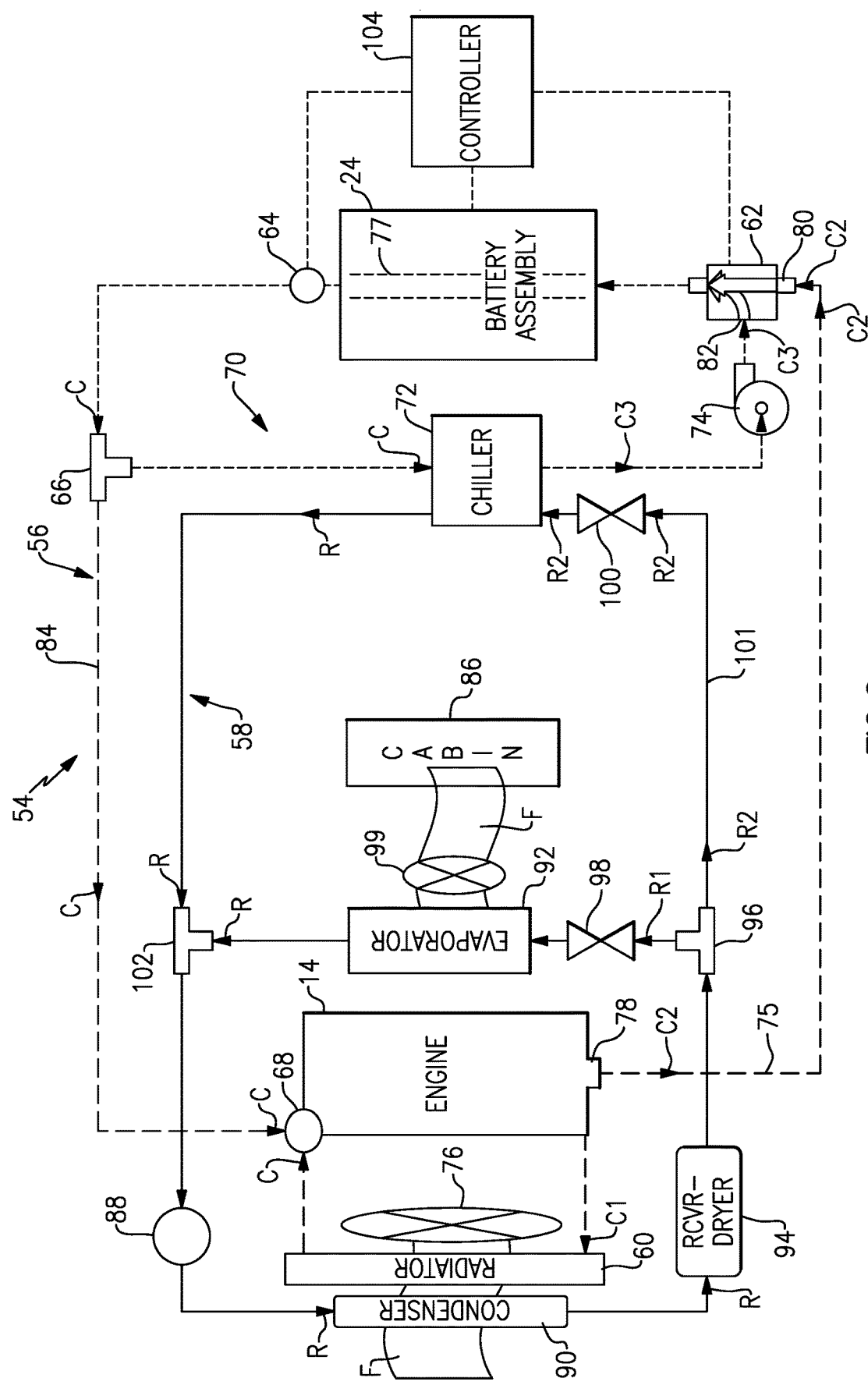
FIG. 2 illustrates a battery thermal management system for an electrified vehicle.

FIG. 2 schematically illustrates a battery thermal management system 54 that can be incorporated into an electrified vehicle, such as the electrified vehicle 12 of FIG. 1. The battery thermal management system 54 may be used to manage the thermal load generated by various vehicle components, such as the engine 14 and the battery assembly 24. In one embodiment, the battery thermal management system 54 selectively communicates coolant to the battery assembly 24 to either heat or cool the battery assembly 24 depending on its temperature and/or other conditions. Although not shown, the battery assembly 24 may include a plurality of battery cells that supply electrical power to the components of the vehicle. The battery assembly 24 may include one or more groupings of battery cells, which are sometimes referred to as "battery arrays."

The battery thermal management system 54 may include a coolant subsystem 56 and a refrigerant subsystem 58. The coolant subsystem 56 is shown in dashed lines and the refrigerant subsystem 58 is shown in solid lines. These systems are described in detail below.

The coolant subsystem 56, or coolant loop, may circulate a coolant C, such as glycol or any other coolant, to thermally manage the battery assembly 24. In one embodiment, the coolant subsystem 56 includes the engine 14, a radiator 60, a three-way valve 62, a temperature sensor 64, a T-joint 66 and a pump 68. The coolant subsystem 56 may additionally include a chiller loop 70 that includes a chiller 72 and a pump 74. Although not shown, the various components of the coolant subsystem 56 can be fluidly interconnected by conduits or passages such as tubes, hoses, pipes, heater core, oil cooler, PTC heater, engine oil cooler, exhaust heat recovery system, etc.

In operation of the coolant subsystem 56, the pump 68, which may be an engine pump that is operatively coupled to the engine 14, communicates coolant C to the engine 14. The coolant C picks up heat within the engine 14. A portion C1 of the coolant C may be communicated to the radiator 60. A fan 76 draws airflow F through the radiator 60 for undergoing heat transfer with the portion C1 of the coolant C. For example, heat from the portion C1 of the coolant C is dumped to the airflow F to cool the portion C1 of the coolant C. Cooled coolant C can then be communicated back to the engine 14 for cooling the engine 14.

Meanwhile, another portion C2 of the coolant C may exit the engine 14 at thermostat 78 into line 75. In one embodiment, the thermostat 78 is a dual stage continuous regulator valve configured to regulate the flow of the coolant C. Under certain operating conditions, the thermostat 78 may prevent communication of the portions C1 and C2 of the coolant C.

The portion C2 of the coolant C may be communicated within line 75 to an inlet 80 of the three-way valve 62. The three-way valve 62 is positioned upstream from the battery assembly 24 to control the flow of the portion C2 of the coolant C through the battery assembly 24. During certain conditions, the inlet 80 of the three-way valve 62 may be actuated (i.e., opened) to communicate the portion C2 of the coolant C to warm the battery assembly 24. In one non-limiting embodiment, the portion C2 of the coolant C may be communicated through a passage 77 of the battery assembly 24. The passage 77 may take any size, shape or configuration and is not limited to the schematic depiction of FIG. 2.

Alternatively, the chiller loop 70 may be used to deliver another portion C3 of the coolant C for cooling the battery assembly 24. Coolant C is cooled within the chiller 72 to provide the portion C3. The portion C3 of the coolant C is then communicated to an inlet 82, which is separate from the inlet 80, of the three-way valve 62. The inlet 82 may be selectively opened and the inlet 80 selectively closed to deliver the portion C3 of the coolant C to the battery assembly 24 for cooling. The pump 74 may be positioned between the chiller 72 and the three-way valve 62 to circulate the portion C3 of the coolant C as necessary.

The temperature sensor 64 is positioned between the battery assembly 24 and the T-joint 66. Alternatively, the temperature sensor 64 could be positioned upstream from or inside of the battery assembly 24. The temperature sensor 64 may be used to detect a temperature of the coolant C that exits the battery assembly 24.

The T-joint 66 may be located downstream from the battery assembly 24. The T-joint 66 is adapted to split the coolant C that exits the battery assembly between the chiller loop 70 and line 84. Coolant C that enters the chiller loop 70 is communicated to the chiller 72 for exchanging heat with refrigerant R of the refrigerant subsystem 58 to generate the cooled portion C3 of the coolant C. In other words, the chiller 72 facilitates the transfer of thermal energy between the chiller loop 70 and the refrigerant subsystem 58. When the chiller loop 70 is not running, coolant C that enters line 84 is returned to engine 14 to complete the closed loop coolant subsystem 56.

The refrigerant subsystem 58, or refrigerant loop, may circulate refrigerant R to transfer thermal energy to or from a passenger cabin 86 and/or to or from the chiller loop 70. For example, the refrigerant subsystem 58 may be part of a main vehicle cooling system that is configured to deliver conditioned airflow to the passenger cabin 86. The refrigerant subsystem 58 is also configured to exchange heat with the chiller loop 70 via the chiller 72, as further discussed below. Although not shown, the various components of the refrigerant subsystem 58 can be fluidly interconnected by conduits or passages such as tubes, hoses, pipes, and/or the like.

In one non-limiting embodiment, the refrigerant subsystem 58 includes a compressor 88, a condenser 90 and an evaporator 92. The chiller 72 of the chiller loop 70 is also in fluid communication with the refrigerant subsystem 58.

During operation of the refrigerant subsystem 58, the compressor 88 pressurizes and circulates refrigerant through the refrigerant subsystem 58. The compressor 88 may be powered by an electrical or non-electrical power source. For example, the compressor 88 could be operatively coupled to the engine 14 or driven by an electrically powered motor. The compressor 88 directs high pressure refrigerant R to the condenser 90.

The high pressure refrigerant R may next exchange heat with the airflow F from the fan 76 within the condenser 90. The condenser 90 transfers heat to the surrounding environment by condensing the refrigerant R from a vapor to a liquid.

The liquid refrigerant R exiting the condenser 90 may be communicated to a receiver dryer. The receiver dryer 94 separates entrained air and gases in the refrigerant R as it flows through the receiver dryer 94.

The refrigerant R is next communicated to a T-joint 96. In one embodiment, the T-joint 96 splits the flow of the refrigerant R between portions R1, R2. The portion R1 of the refrigerant R is communicated to an on/off switch 98 that is configured to control the flow of the portion R1 of the refrigerant R to the evaporator 92. The on/off switch 98 may or may not be externally controlled.

Within the evaporator 92, heat is transferred between the surrounding environment and the portion R1 of the refrigerant R, thereby causing the portion R1 of the refrigerant R to vaporize. A fan 99 may communicate an airflow F across the evaporator 92 for effectuating such heat transfer and to deliver conditioned airflow to the passenger cabin 86 as commanded by a driver operator.

A second portion R2 of the refrigerant R may be communicated from the T-joint 96 to another on/off switch 100 in line 101. The on/off switch 100 is located between the T-joint 96 and the chiller 72 of the chiller loop 70 and is configured to control the flow of the portion R2 of the refrigerant R similar to the on/off switch 98.

The chiller 72 of the chiller loop 70 is in fluid communication with the refrigerant subsystem 58. In this way, the chiller 72 is part of both the chiller loop 70 and the refrigerant subsystem 58. The portion R2 of the refrigerant R may exchange heat with the coolant C of the chiller loop 70 within the chiller 72 to provide the cooled portion C3 of the coolant C, which can be used to cool the battery assembly 24. Refrigerant R exiting the chiller 72 is delivered to another T-joint 102. The refrigerant R exiting the chiller 72 combines with refrigerant R exiting the evaporator 92 within the T-joint 102. The combined refrigerant R is returned to the compressor 88 and then back to the condenser 90 as part of a closed loop system.

The battery thermal management system 54 may additionally include a controller 104. The controller 104 is configured to control operation of the coolant subsystem 56 and the refrigerant subsystem 58 with the chiller loop 70 to either heat or cool the battery assembly 24. The controller 104 may be part of an overall vehicle control unit, such as a vehicle system controller (VSC), or could alternatively be a stand-alone control unit separate from the VSC. In one embodiment, the controller 104 includes executable instructions for interfacing with and operating the various components of the battery thermal management system 54. The controller 104 may include inputs and outputs for interfacing with the various components of the battery thermal management system 54. The controller 104 may additionally include a processing unit and non-transitory memory for executing the various control strategies and modes of the battery thermal management system 54.

In one embodiment, the controller 104 is adapted to monitor a temperature of the battery assembly 24. The controller 104 may receive feedback from various sensors that monitor the temperature of the battery assembly 24, including but not limited to ambient sensors and battery cell sensors. Based on feedback from such sensors, the controller 104 can command opening or closing of the inlets 80, 82 of the three-way valve 62 to deliver either the portion C2 of the coolant C for warming the battery assembly 24 or the portion C3 of the coolant C for cooling the battery assembly 24.

Figure 3:
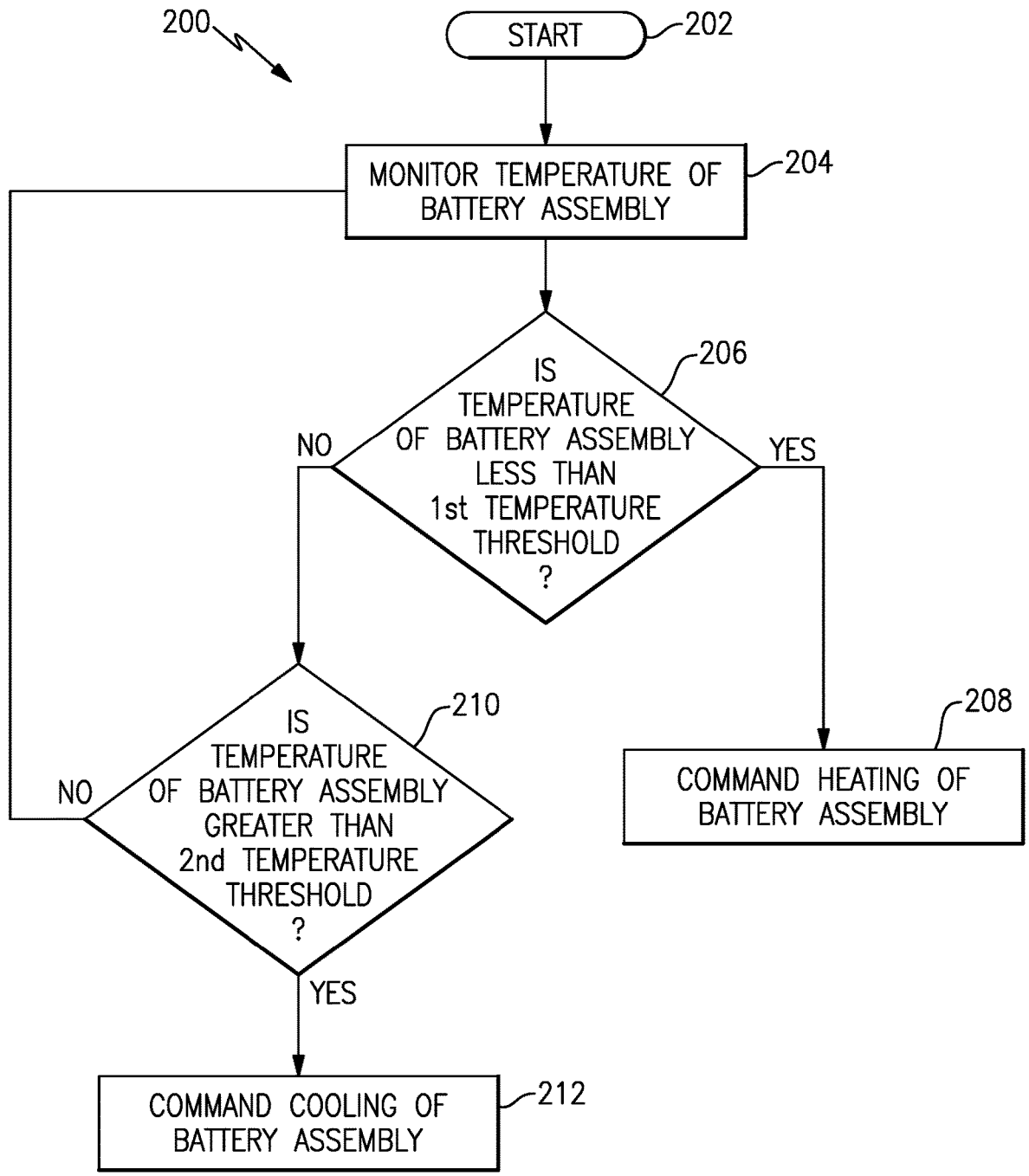
FIG. 3 schematically illustrates an exemplary control strategy for thermally managing a battery assembly of an electrified vehicle.

FIG. 3, with continued reference to FIGS. 1 and 2, schematically illustrates a control strategy 200 for thermally managing the battery assembly 24 of the electrified vehicle 12. For example, the control strategy 200 may be executed during certain conditions to either heat or cool the battery assembly 24 depending on the temperature of the battery assembly 24, ambient conditions, any heat source near the battery assembly 24, among other factors. Of course, the electrified vehicle 12 is capable of implementing and executing other control strategies within the scope of this disclosure. In one embodiment, the controller 104 of the battery thermal management system 54 is programmed with one or more algorithms adapted to execute the control strategy 200, or any other control strategy. In other words, the control strategy 200 may be stored as executable instructions in the non-transitory memory of the controller 104. In another embodiment, the control strategy 200 is stored in the vehicle system controller (VSC), which can communicate with the controller 104 to execute operation of the battery thermal management system 54.

As shown in FIG. 3, the control strategy 200 starts at block 202. At block 204, a temperature of the battery assembly 24 is monitored. Next, a block 206, the control strategy 200 determines whether the temperature of the battery assembly 24 is lower than a first temperature threshold. The first temperature threshold may be set at any temperature and represents the temperature below which the battery assembly 24 must be heated to ensure proper operation. If the temperature of the battery assembly 24 is below the first temperature threshold, the control strategy 200 may proceed to block 208 by commanding heating of the battery assembly 24. In one non-limiting embodiment, the battery assembly 24 is heated by opening the inlet 80 of the three-way valve 62 to direct the portion C2 of the coolant C through the passage 77 of the battery assembly 24. The portion C2 of the coolant C is communicated from the engine 14 and therefore includes a temperature sufficient to warm the battery assembly 24.

Alternatively, if the temperature of the battery assembly 24 is not below the first temperature threshold at block 206, the control strategy 200 determines whether the temperature of the battery assembly 24 is above a second temperature threshold at block 210. The second temperature threshold is a different threshold value than the first temperature threshold, may be set at any temperature, and represents the temperature above which the battery assembly 24 must be cooled to ensure proper operation.

The control strategy 200 commands cooling of the battery assembly 24 at block 212 if the temperature of the battery assembly 24 exceeds the second temperature threshold. In one non-limiting embodiment, the battery assembly 24 is cooled by opening the inlet 82 of the three-way valve 62 to direct the portion C3 of the coolant C through the passage 77 of the battery assembly 24. The portion C3 of the coolant C is communicated from the chiller 72 of the chiller loop 70 and therefore includes a temperature sufficient to cool the battery assembly 24.

The control strategy 200 returns to block 204 and continues to monitor the temperature of the battery assembly 24 if it is determined at block 210 that the temperature of the battery assembly 24 is not above the second temperature threshold.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
monitoring a temperature associated with a battery assembly with a temperature sensor located immediately downstream from an outlet of the battery assembly,
wherein the battery assembly is part of a coolant subsystem that includes the temperature sensor, an internal combustion engine, a radiator, a three-way valve located immediately upstream from an inlet of the battery assembly, and a T-joint positioned between the outlet of the battery assembly and an inlet of the internal combustion engine;
opening a first inlet of the three-way valve to deliver a first portion of a coolant circulated by the coolant subsystem to the battery assembly when the temperature monitored by the temperature sensor is below a first temperature threshold; and
opening a second inlet of the three-way valve to deliver a second portion of the coolant to the battery assembly when the temperature monitored by the temperature sensor is above a second temperature threshold, wherein a controller is configured to control the coolant subsystem by commanding the opening of the first inlet and the second inlet based on the temperature monitored by the temperature sensor, wherein the first portion of the coolant includes a different temperature than the second portion of the coolant.

2. The method as recited in claim 1, comprising performing a heat transfer between the coolant and a refrigerant of a refrigerant subsystem.

3. The method as recited in claim 1, wherein opening the first inlet of the three-way valve communicates the first portion of the coolant from the internal combustion engine to the battery assembly.

4. The method as recited in claim 3, wherein opening the second inlet of the three-way valve communicates the second portion of the coolant from a chiller to the battery assembly.

5. The method as recited in claim 3, comprising dividing a flow of the first portion of the coolant from the internal combustion engine between the radiator and the three-way valve.

6. The method as recited in claim 1, wherein the T-joint is configured to split the coolant that exits from the battery assembly between the internal combustion engine and a chiller.

7. The method as recited in claim 6, wherein the first portion of the coolant is communicated from the internal combustion engine and the second portion of the coolant is communicated from the chiller.

8. The method as recited in claim 6, wherein the chiller is part of a chiller loop of the coolant subsystem.

9. The method as recited in claim 1, wherein the battery assembly, the internal combustion engine, the three-way valve, and the T-joint are positioned in a common coolant line of the coolant subsystem.

10. The method as recited in claim 1, wherein the first temperature threshold is set at a lower temperature than the second temperature threshold.

11. The method as recited in claim 1, comprising continuing to monitor the temperature of the battery assembly when the temperature is neither less than the first temperature threshold nor greater than the second temperature threshold.

12. The method as recited in claim 1, wherein the internal combustion engine includes a thermostat that controls a flow of the coolant exiting from the internal combustion engine, and further wherein the first portion of the coolant is communicated directly from the thermostat to the first inlet of the three-way valve and the second portion of the coolant is communicated from a chiller loop directly to the second inlet of the three-way valve.

13. The method as recited in claim 1, wherein the three-way valve is the closest component of the coolant subsystem to the inlet of the battery assembly and the temperature sensor is the closest component of the coolant subsystem to the outlet of the battery assembly.

* * * * *